US012552098B2

(12) United States Patent
Ueda et al.

(10) Patent No.: US 12,552,098 B2
(45) Date of Patent: Feb. 17, 2026

(54) RECOATER AND POWDER ADDITIVE MANUFACTURING APPARATUS

(71) Applicant: THE JAPAN STEEL WORKS, LTD., Tokyo (JP)

(72) Inventors: Naoki Ueda, Tokyo (JP); Seiya Hiramatsu, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 134 days.

(21) Appl. No.: 18/285,255

(22) PCT Filed: Feb. 8, 2022

(86) PCT No.: PCT/JP2022/004891
§ 371 (c)(1),
(2) Date: Oct. 1, 2023

(87) PCT Pub. No.: WO2022/224548
PCT Pub. Date: Oct. 27, 2022

(65) Prior Publication Data
US 2024/0190068 A1   Jun. 13, 2024

(30) Foreign Application Priority Data
Apr. 22, 2021   (JP) .................................. 2021-072290

(51) Int. Cl.
*B29C 64/218* (2017.01)
*B29C 64/153* (2017.01)
(Continued)

(52) U.S. Cl.
CPC .......... *B29C 64/218* (2017.08); *B29C 64/153* (2017.08); *B29C 64/188* (2017.08); *B29C 64/307* (2017.08); *B33Y 30/00* (2014.12)

(58) Field of Classification Search
CPC .................................................. B29C 64/218
See application file for complete search history.

(56) References Cited

U.S. PATENT DOCUMENTS

2002/0152002 A1   10/2002   Lindemann et al.
2009/0090259 A1*  4/2009   Bras ........................ B41F 13/11
                                                            101/154
(Continued)

FOREIGN PATENT DOCUMENTS

JP   H10-513130 A   12/1998
JP   2002-332504 A   11/2002
(Continued)

OTHER PUBLICATIONS

International Search Report for International Patent Application No. PCT/JP2022/004891, Mar. 22, 2022.

(Continued)

*Primary Examiner* — Timothy Kennedy
(74) *Attorney, Agent, or Firm* — Potomac Law Group, PLLC (57) ABSTRACT

A recoater supplies a predetermined amount of powder and spreads the supplied powder across a powder bed. The recoater includes a main shaft, a moving mechanism, and a powder guiding part. The main shaft rotates about an axis parallel to a surface of the powder bed. The moving mechanism moves the main shaft in a moving direction perpendicular to the main shaft and parallel to the surface of the powder bed. The powder guiding part is disposed around the main shaft along a predetermined inclination angle relative to the moving direction.

9 Claims, 4 Drawing Sheets

(51) Int. Cl.
*B29C 64/188* (2017.01)
*B29C 64/307* (2017.01)
*B33Y 30/00* (2015.01)

(56) References Cited

U.S. PATENT DOCUMENTS

2017/0136695 A1* 5/2017 Versluys ............... B29C 64/205
2017/0341365 A1 11/2017 Lajudie et al.
2018/0141125 A1 5/2018 Miyashita et al.
2019/0039301 A1 2/2019 Yusef et al.
2020/0282594 A1 9/2020 Ladewig et al.
2021/0331391 A1* 10/2021 Nauka ................... B29C 64/295

FOREIGN PATENT DOCUMENTS

| | | |
|---|---|---|
| JP | 2017-508063 A | 3/2017 |
| JP | 2018-526527 A | 9/2018 |
| JP | 2019-142017 A | 8/2019 |
| JP | 2020-147038 A | 9/2020 |
| TW | 201819071 A | 6/2018 |
| WO | 96/23647 A2 | 8/1996 |
| WO | 2015/151831 A1 | 10/2015 |
| WO | 2016/205758 A1 | 12/2016 |
| WO | 2019/231748 A1 | 12/2019 |

OTHER PUBLICATIONS

Office Action issued May 27, 2025, in Japanese Patent Application No. 2024-188328.
Office Action issued Jul. 3, 2025, in Taiwanese Patent Application No. 111107438.

\* cited by examiner

RECOATER AND POWDER ADDITIVE MANUFACTURING APPARATUS

TECHNICAL FIELD

The present invention relates to a recoater and a powder additive manufacturing apparatus.

BACKGROUND ART

Powder additive manufacturing apparatuses have become widespread. Further, various techniques related to a recoater for spreading powder across a powder bed of a powder additive manufacturing apparatus have been proposed.

For example, means, which includes a reverse roller for sweeping (i.e., leveling) across at least a part of a surface of a layer and thereby forming the layer with a desired thickness, for forming a layer of material adjacent to an already formed cross section (i.e., an already formed side wall) of an object has been disclosed (Patent Literature 1).

CITATION LIST

Patent Literature

Patent Literature 1: Published Japanese Translation of PCT International Publication for Patent Application, H10-513130

SUMMARY OF INVENTION

Technical Problem

However, when powder is spread across a powder bed, there is the following problem. That is, the fluidity of the powder varies depending on the variations in the particle sizes of the powder and the impurities and moisture contained in the powder. Therefore, unevenness occurs in the density of the powder supplied to the recoater. Consequently, when the powder is spread by using the above-described technique, unevenness occurs in the powder bed. When there is unevenness in the powder bed, the accuracy of products to be manufactured (hereinafter referred to simply as manufactured products) by the powder additive manufacturing apparatus may deteriorate.

The present disclosure has been made to solve the above-described problem, and an object thereof is to provide a recoater and a powder additive manufacturing apparatus capable of preventing unevenness from occurring in powder that is spread across a powder bed.

Solution to Problem

A recoater 10 according to the present disclosure supplies a predetermined amount of powder and spreads the supplied powder across a powder bed. The recoater 10 includes a main shaft 133, a moving mechanism 11, and a powder guiding part 135. The main shaft 133 rotates about an axis parallel to a surface of the powder bed. The moving mechanism 11 moves the main shaft in a moving direction that is perpendicular to the main shaft and parallel to the surface of the powder bed. The powder guiding part 135 is disposed along a predetermined inclination angle relative to the movement direction around the main shaft.

Advantageous Effects of Invention

According to the present disclosure, it is possible to provide a recoater and a powder additive manufacturing apparatus capable of preventing unevenness from occurring in powder that is spread across a powder bed.

DESCRIPTION OF EMBODIMENTS

The present invention will be described hereinafter through embodiments according to the invention, but the invention, which is specified by the claims, is not limited to the below-shown embodiments. Further, all the components/structures described in the embodiments are not necessarily indispensable as means for solving the problem. For clarifying the explanation, the following descriptions and drawings are partially omitted and simplified as appropriate. Note that the same reference numerals (or symbols) are assigned to the same elements throughout the drawings and redundant explanations thereof are omitted as appropriate.

EMBODIMENTS

Figure 1:
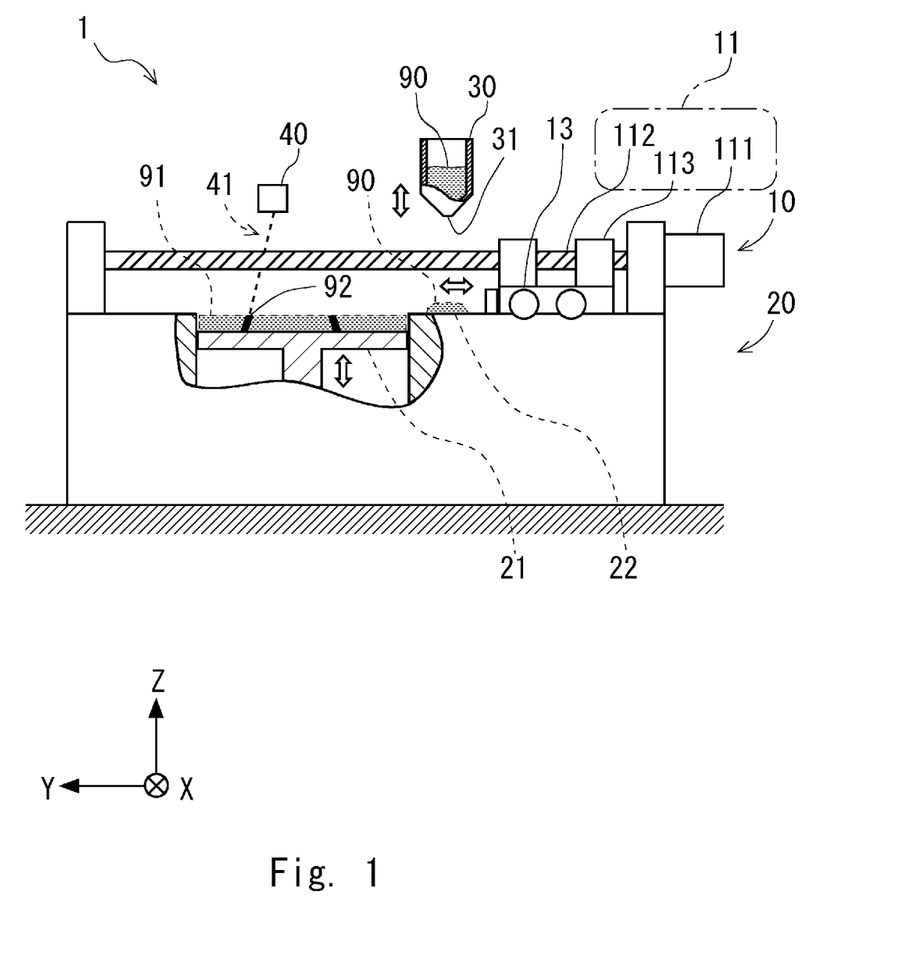
FIG. 1 is an overall view of a powder additive manufacturing apparatus according to an embodiment.

Embodiments according to the present invention will be described hereinafter with reference to the drawings. FIG. 1 is an overall diagram of a powder additive manufacturing apparatus according to an embodiment. The powder additive manufacturing apparatus 1 shown in FIG. 1 is a type of so-called 3D (three-dimensional) printer, and manufactures a desired 3D shape by forming and stacking a plurality of thinly-sliced 2D (two-dimensional) layers one after another based on 3D design data. The powder additive manufacturing apparatus 1 includes, as its main components, a recoater 10, a main-body block 20, a powder supply apparatus 30, and a laser oscillation device 40.

Note that in FIG. 1, a right-handed orthogonal coordinate system is shown for explaining the positional relationship among the components. Further, in FIG. 2 and the subsequent drawings, when an orthogonal coordinate system is shown, the X-, Y-, and Z-axis directions in the orthogonal coordinate system coincide with the X-, Y-, and Z-axis directions, respectively, shown in FIG. 1.

FIG. 1 is a side view of the powder additive manufacturing apparatus 1, in which a part of the powder additive manufacturing apparatus 1 is shown in a cross section for the sake of clarifying the explanation. In the powder additive manufacturing apparatus 1 shown in FIG. 1, powder 90 is spread across a powder bed 91 by having a movable block 13 of the recoater 10 move from the right side (Y-axis negative side), which corresponds to one end of the powder additive manufacturing apparatus 1, to the left side (Y-axis positive side), which corresponds to the other end of the powder additive manufacturing apparatus 1. That is, in the powder additive manufacturing apparatus 1, the right side in FIG. 1 is the initial position of the movable block 13, and by having the movable block 13 move from this initial position to the left side, the powder 90, which is the material for a manufactured product, is spread across the powder bed 91. When the movable block 13 has been moved to the other end of the powder additive manufacturing apparatus 1 and hence the powder 90 has been spread across the powder bed 91, the movable block 13 returns to the initial position shown in the drawing.

Note that when the powder 90 is spread across the powder bed 91 as described above, the powder additive manufacturing apparatus 1 performs the following operations. That is, the laser oscillation device 40 melts a part of the powder 90 located at a desired position corresponding to the shape of the manufactured product. Next, the main-body block 20 moves the powder bed 91 downward a predetermined distance. Further, the powder supply apparatus 30 supplies a predetermined amount of powder 90 to the recoater 10. Then, the recoater 10 spreads the supplied powder 90 across the powder bed 91 again. The powder additive manufacturing apparatus 1 repeats the above-described series of operations and thereby manufactures a desired 3D shape. Note that the powder 90 in this embodiment is powder mainly composed of a metal or a resin that can be melted by laser light.

In the following descriptions, a direction parallel to the Y-axis may also be referred to as the "moving direction of the recoater 10". Further, in the following descriptions, the Y-axis positive direction is also referred to as the forward direction, and the Y-axis negative direction is also referred to as the rearward direction. Further, in the following descriptions, the X-axis positive direction is also referred to as the right direction, and the X-axis negative direction is also referred to as the left direction. Further, the Z-axis positive direction is also referred to as the upward direction, and the Z-axis negative direction is also referred to as the downward direction.

The recoater 10 interacts (i.e., cooperates) with the powder supply apparatus 30 and the main-body block 20, and forms the powder bed 91 by spreading powder supplied from the powder supply apparatus 30 across (the surface of) a powder bed support part 21 of the main-body block 20. The recoater 10 includes, as its main components, a moving mechanism 11 and a movable block 13.

The moving mechanism 11 includes a feeding shaft drive motor 111, a feeding shaft 112, and a bearing 113. The feeding shaft drive motor 111 is a motor for rotating the feeding shaft 112. The feeding shaft 112 is supported at both ends of the powder additive manufacturing apparatus 1 in parallel with the moving direction of the recoater 10, and is inserted into the bearing 113. The feeding shaft 112 includes a spiral guide groove formed therein, and a projecting part of the bearing 113 is slidably engaged in the guide groove. The bearing 113 is connected to the movable block 13 and slidably engaged with the feeding shaft 112, and is configured so that when the feeding shaft 112 rotates, the movable block 13 linearly moves from one end of the powder additive manufacturing apparatus 1 to the other end thereof.

By the above-described configuration, the moving mechanism 11 moves the movable block 13 from one end of the powder additive manufacturing apparatus 1 to the other end thereof by having the feeding shaft drive motor 111 rotate the feeding shaft 112. Note that the moving mechanism 11 may have an auxiliary shaft (not shown). The auxiliary shaft is disposed in parallel with the feeding shaft 112 and slidably engaged with the movable block 13, so that the auxiliary shaft stabilizes the movement of the movable block 13 when it moves.

The main-body block 20 includes a housing that supports the powder additive manufacturing apparatus 1 on its stationary surface. Further, the main-body block 20 also supports the recoater 10 at the top thereof. The main-body block 20 includes, as its main components, the powder bed support part 21 and a powder receiving part 22.

The powder bed support part 21 is engaged in a rectangular hole formed in the upper surface of the main-body block 20 in such a manner that the powder bed support part 21 can be moved up and down. The upper surface of the powder bed support part 21 is flat, and the powder bed support part 21 supports the powder bed 91 by this upper surface. The powder receiving part 22 is a flat surface provided between the powder bed support part 21 and the movable block 13, and receives the powder 90 supplied from the powder supply apparatus 30.

The powder supply apparatus 30 stores the powder 90 and supplies the powder 90 to the powder receiving part 22 of the main-body block 20 as required. The powder supply apparatus 30 is disposed so that it can be moved up and down. When the powder 90 is supplied to the main-body block 20, the powder supply apparatus 30 is lowered, and when the supply of the powder 90 is finished, the powder supply apparatus 30 is raised so that it does not interfere with the movement of the movable block 13. The powder supply apparatus 30 includes a powder supply port 31. Through the powder supply port 31, the powder 90 stored in the powder supply apparatus 30 is discharged into the powder receiving part 22.

The laser oscillation device 40 is disposed above the powder bed support part 21 and applies laser light 41 to a desired position on the powder bed 91 formed over the upper surface of the powder bed support part 21. As the laser oscillation device 40 applies the laser light 41 to the powder bed 91, a manufactured product 92 is formed in the powder bed 91.

The main components/structures included in the powder additive manufacturing apparatus 1 have been described above. In the powder additive manufacturing apparatus 1, the powder 90, which is a material powder, is thinly spread on the powder bed 91 in order to manufacture a desired 3D shape. Then, the powder additive manufacturing apparatus 1 applies laser light 41 to the thinly-spread powder 90 and thereby melts the powder 90, lets the molten material bond together and solidify, and by doing so, forms a sliced shape. The powder additive manufacturing apparatus 1 manufactures a desired 3D shape by repeating this formation of the sliced shape and thereby stacking sliced shapes one after another.

Figure 2:
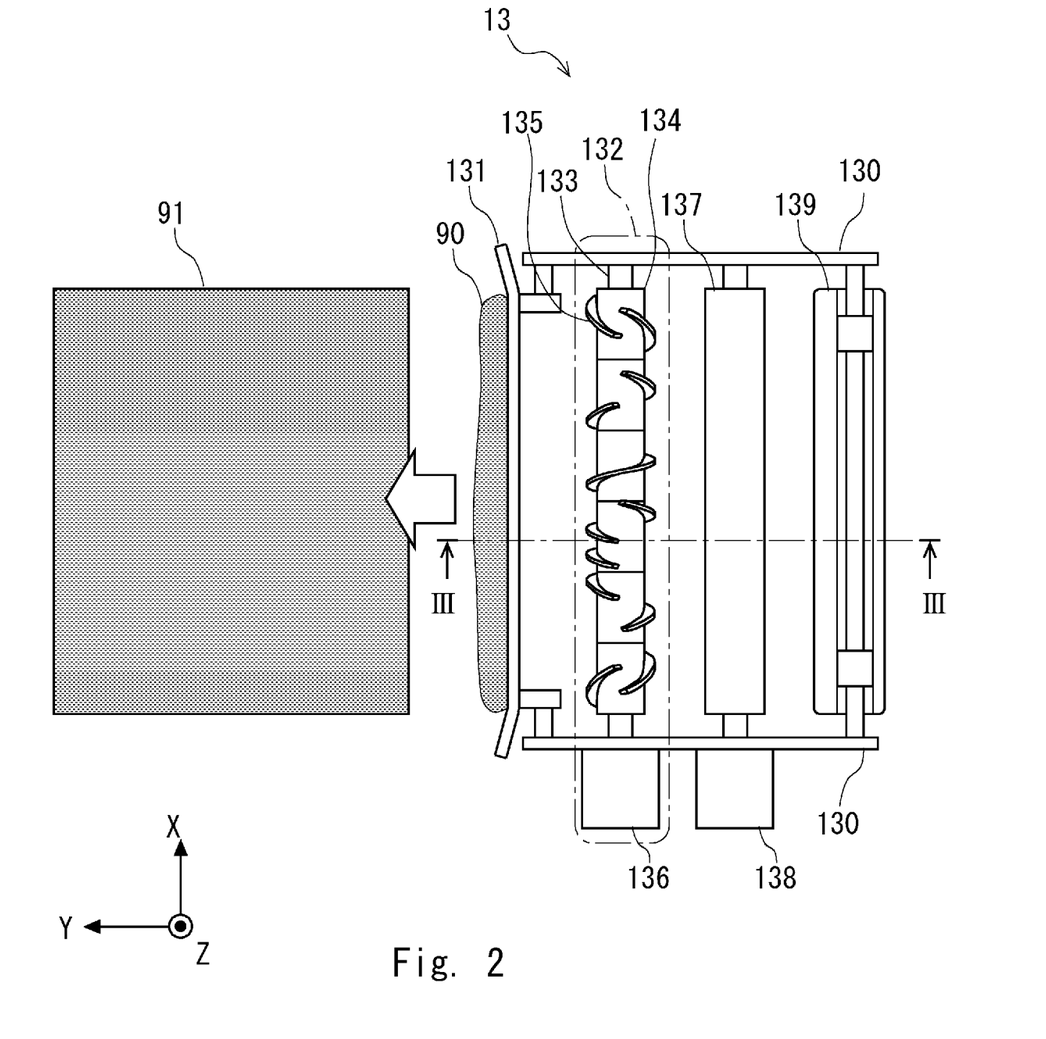
FIG. 2 is a plan view of a recoater according to an embodiment.

Next, details of the movable block 13 will be described with reference to FIG. 2. FIG. 2 is a plan view of a recoater according to an embodiment. FIG. 2 shows a plan view of the movable block 13. The movable block 13 includes, as its main components, a frame 130, a leveling plate 131, a powder guiding block 132, a powder pressing roller 137, a roller drive motor 138, and a powder pressing plate 139. FIG. 2 shows a state in which the movable block 13 moves in the Y-axis positive direction (i.e., to the front of the powder additive manufacturing apparatus 1) and conveys (i.e., moves) the powder 90 supplied from the powder supply apparatus 30 to the powder bed 91.

The frame 130 is a structure for supporting the other components of the movable block 13 and supports the left and right ends of each of the leveling plate 131, the powder guiding block 132, the powder pressing roller 137, the roller drive motor 138, and the powder pressing plate 139. Further, the frame 130 is connected to the bearing 113 shown in FIG. 1 and configured so as to interact (i.e., cooperate) with the bearing 113.

The leveling plate 131 is a plate-like member for leveling the surface of the powder bed 91 while moving the powder 90 supplied from the powder supply apparatus 30 to the powder bed 91. The leveling plate 131 is disposed in front of the main shaft 133 in the moving direction, and is configured so that its main surface faces forward in the moving direction and one of its ends comes into contact with the surface of the powder bed 91 while being parallel to the surface of the powder bed 91. Note that the left and right ends of the leveling plate 131 may be bent or curved forward as shown in FIG. 2. In this way, the leveling plate 131 can prevent the powder 90 from moving to an area outside the powder bed 91 at the left and right ends thereof.

The powder guiding block 132 makes, after the leveling plate 131 has leveled the surface of the powder bed 91, the powder 90 uniform and smooth even further on the surface of the powder bed 91. The powder guiding block 132 includes, as its main components, the main shaft 133, a conversion part 134, powder guiding parts 135, and a main-shaft drive motor 136.

The main shaft 133 is rotatably supported in a direction that is parallel to the surface of the powder bed 91 and perpendicular to the moving direction (i.e., parallel to the X-axis). Further, one end of the main shaft 133 is connected to the main-shaft drive motor 136. In this way, when the movable block 13 moves forward, the main shaft 133 comes into contact with the powder bed 91 while rotating. In other words, the moving mechanism 11 moves the main shaft 133 in the moving direction, which is perpendicular to the main shaft 133 and parallel to the surface of the powder bed 91.

The conversion part 134 is composed of a plurality of cylindrical members that are successively connected along the axial direction (X-axis direction) around the main shaft 133 and on the inner side of the powder guiding parts 135. The conversion part 134 is engaged with the main shaft 133 at its inner-diameter part and rotates in an interlocked manner with the main shaft 133. Further, the conversion part 134 holds (i.e., supports) the powder guiding parts 135 at its outer-diameter part.

The powder guiding parts 135 are projecting members fixed around the main shaft 133 or the conversion part 134. The powder guiding block 132 in this embodiment includes a plurality of powder guiding parts 135. The powder guiding parts 135 are fixed to the outer peripheral part of the conversion part 134 along a predetermined inclination angle relative to the moving direction.

The powder pressing roller 137 makes, after the powder guiding block 132 has passed the surface of the powder bed 91, the surface of the powder bed 91 uniform and smooth even further. The powder pressing roller 137 is a cylindrical member that is rotatably supported on the frame 130 at its left and right ends behind the main shaft 133. The powder pressing roller 137 is disposed in parallel with the main shaft 133, and comes into contact with the surface of the powder bed 91 while being parallel to the surface of the powder bed 91. Further, one end of the powder pressing roller 137 is connected to the roller drive motor 138. The roller drive motor 138 is fixed to the frame 130 and drives the powder pressing roller 137. In this way, when the movable block 13 moves forward, the powder pressing roller 137 comes into contact with the powder bed 91 while rotating.

The powder pressing plate 139 makes, after the powder pressing roller 137 has passed the surface of the powder bed 91, the surface of the powder bed 91 uniform and smooth even further. The powder pressing plate 139 is disposed behind the main shaft 133, more specifically behind the powder pressing roller 137, in the moving direction. The powder pressing plate 139 includes a powder pressing surface that comes into contact with the surface of the powder bed 91 while being parallel to the surface of the powder bed 91.

Figure 3:
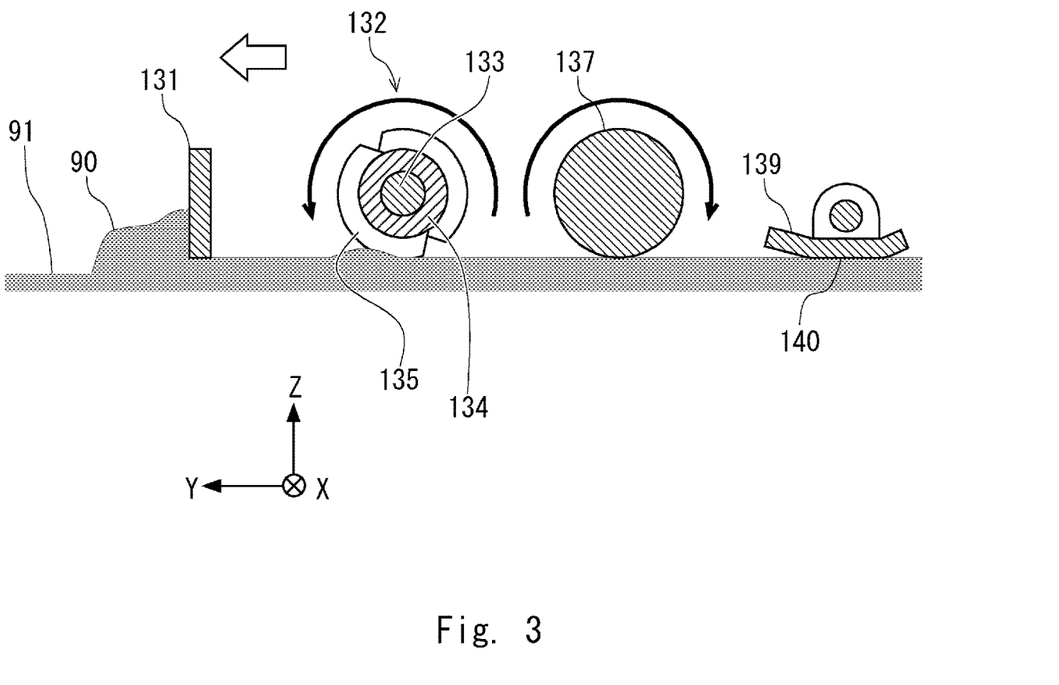
FIG. 3 is a cross-sectional diagram of the recoater according to the embodiment.

The movable block 13 will be further described with reference to FIG. 3. FIG. 3 is a cross-sectional diagram of the recoater according to the embodiment. FIG. 3 shows a cross section of the movable block 13 taken along a line III-III in FIG. 2. Further, FIG. 3 shows a state in which the movable block 13 has moved forward from the state shown in FIG. 2, and is moving on the surface of the powder bed 91.

In FIG. 3, the leveling plate 131 is moving forward while leveling the powder 90. The main surface of the leveling plate 131 faces in the moving direction of the movable block 13, and its lower end comes into contact with the surface of the powder bed 91 while being parallel to the surface of the powder bed 91.

Each of the powder guiding parts 135, which are disposed behind the leveling plate 131, includes a tip part that extends along a circumference at a predetermined distance from the center of the main shaft 133. The tip parts of the powder guiding parts 135 come into contact with the powder 90 while rotating, and thereby making the powder bed 91 uniform and smooth. Note that the main shaft 133 in this embodiment moves forward while rotating in a rotating direction in which the main shaft 133 rotates in the moving direction. Note that in the following descriptions, this rotating direction is referred to as a forward rotating direction. The conversion part 134 is fixed around the main shaft 133. The conversion part 134 is a cylindrical member whose inner-diameter part is engaged with the main shaft 133, and holds (i.e., supports) the powder guiding parts 135 at its outer-diameter part. That is, the powder guiding parts 135 are fixed to the outer peripheral part of the conversion part 134.

The powder pressing roller 137, which is disposed behind the powder guiding block 132, is moving while making the surface of the powder bed 91 uniform and smooth even further. The powder pressing roller 137 in this embodiment is moving while rotating in a rotating direction in which the powder pressing roller 137 rotates in the direction opposite to the moving direction. Note that in the following descriptions, this rotating direction is referred to as a reverse rotating direction.

The powder pressing plate 139, which is disposed behind the powder pressing roller 137, includes a powder pressing surface 140 that comes into contact with the surface of the powder bed 91 while being parallel to the surface of the powder bed 91. Each of the front and rear ends of the powder pressing surface 140 has a guiding shape. In this way, the powder pressing plate 139 makes the powder bed 91 uniform and smooth even further.

Figure 4:
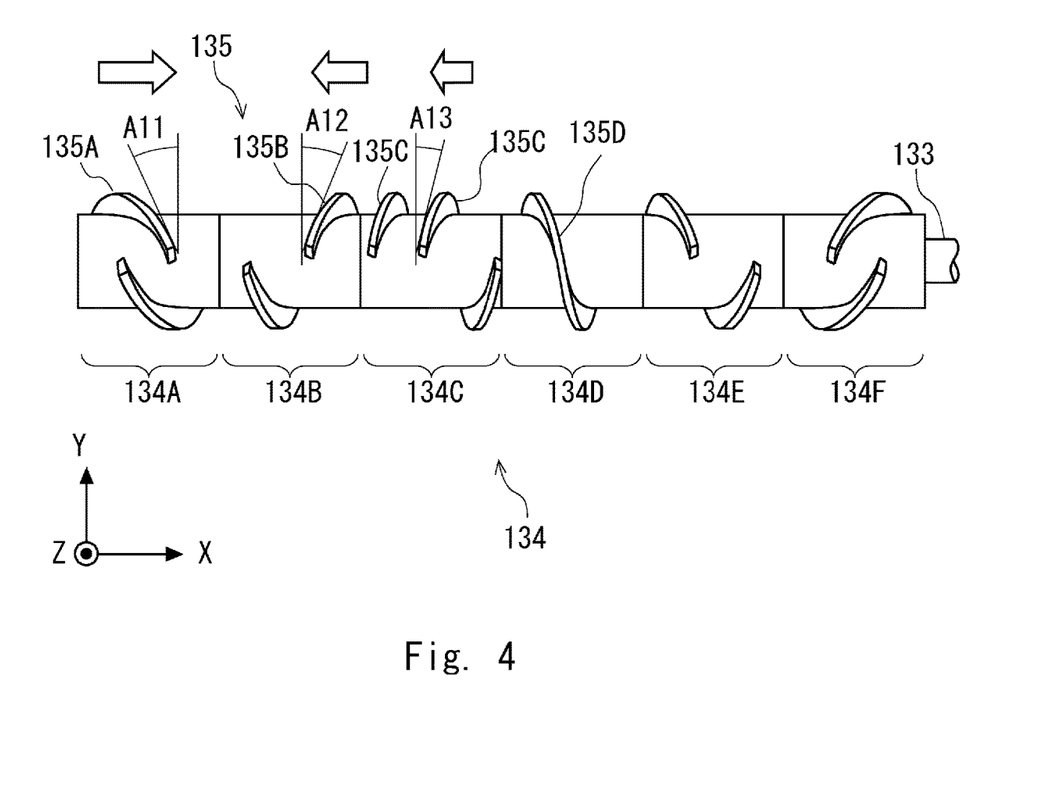
FIG. 4 shows an example of shapes of powder guiding parts according to an embodiment.

Next, an example of the shapes of the powder guiding parts 135 provided in the powder guiding block 132 will be described with reference to FIG. 4. FIG. 4 shows an example of the shapes of powder guiding parts according to the embodiment. FIG. 4 is a plan view of the conversion part 134 and the powder guiding parts 135. In conversion part 134 shown in FIG. 4, as viewed from left to right, a first conversion part 134A, a second conversion part 134B, a third conversion part 134C, a fourth conversion part 134D, a fifth conversion part 134E, and a 6th conversion part 134F are successively connected.

Each of the first to fifth conversion parts 134A to 134E is detachably fixed to the main shaft 133. However, when the first to fifth conversion parts 134A to 134E are fixed to the main shaft 133, they move in unison with the main shaft 133.

By forming the conversion part 134 as a plurality of sections for respective areas, it is possible, in the recoater 10, to easily replace a section of the conversion part 134 and a powder guiding part(s) 135 held by that section of the conversion part 134. Therefore, the recoater 10 in this embodiment has such a configuration that its setting can be easily changed and its maintenance can be easily performed.

Each of the first to fifth conversion parts 134A to 134E includes at least one powder guiding part 135. Each of the powder guiding parts 135 is provided around the main shaft 133 along a predetermined inclination angle relative to the moving direction.

The first conversion part 134A includes, for example, a first powder guiding part 135A. The first powder guiding part 135A is formed so as to form a first inclination angle A11 between the first powder guiding part 135A and the moving direction. Further, the first powder guiding part 135A is formed in a direction in which when the main shaft 133 is rotated in the forward rotating direction, the part of the first powder guiding part 135A that is in contact with the powder bed 91 moves from the outer side of the main shaft 133 to the inner side thereof. That is, the first powder guiding part 135A is configured so as to move the powder 90 laid in the area of the first conversion part 134A from the outer side to the inner side in the left/right direction while the first powder guiding part 135A itself is moving on the surface of the powder bed 91 in the moving direction.

The second conversion part 134B includes, for example, a second powder guiding part 135B. The second powder guiding part 135B is formed so as to form a second inclination angle A12 smaller than the above-described first inclination angle A11 between the second powder guiding part 135B and the moving direction. Further, the second powder guiding part 135B is formed in a direction in which when the main shaft 133 is rotated in the forward rotating direction, the part of the second powder guiding part 135B that is in contact with the powder bed 91 moves from the inner side of the main shaft 133 to the outer side thereof. That is, the second powder guiding part 135B is configured so as to move the powder 90 laid in the area of the second conversion part 134B from the inner side to the outer side in the left/right direction while the second powder guiding part 135B itself is moving on the powder bed 91 in the moving direction.

The third conversion part 134C includes, for example, two third powder guiding parts 135C. The two third powder guiding parts 135C are formed so as to form a third inclination angle A13 smaller than the above-described second inclination angle A12 between the third powder guiding parts 135C and the moving direction. Further, the third powder guiding part 135C is formed in a direction in which when the main shaft 133 is rotated in the forward rotating direction, the part of the third powder guiding part 135C that is in contact with the powder bed 91 moves from the inner side of the main shaft 133 to the outer side thereof. That is, the third powder guiding part 135C is configured so as to move the powder 90 laid in the area of the third conversion part 134C from the inner side to the outer side in the left/right direction while the third powder guiding part 135C itself is moving on the powder bed 91 in the moving direction.

By the above-described configuration, the powder guiding parts 135 moves, in the area where it is disposed, the powder 90 laid in the contact area in the left/right direction while the powder guiding parts 135 themselves are moving in the moving direction along the surface of the powder bed 91. The amount of powder 90 that the powder guiding part 135 moves is set by the moving speed of the movable block 13, the rotation speed of the main shaft 133, and the angle between the powder guiding part 135 and the moving direction. That is, the slower the moving speed of the movable block 13 is, the larger amount of powder 90 the powder guiding part 135 moves. Further, the faster the rotation speed of the main shaft 133 is, the larger amount of powder 90 the powder guiding part 135 moves.

Further, the relative distance by which the powder guiding part 135 moves the powder 90 in the left/right direction is set according to the angle between the powder guiding part 135 and the moving direction. More specifically, the larger the angle between the powder guiding part 135 and the moving direction is, the longer the distance by which the powder guiding part 135 moves the powder 90 in the left/right direction becomes.

In the case of the above-described example, the first powder guiding part 135A having the first inclination angle A11, which is the largest angle relative to the moving direction, moves the powder 90 in the left/right direction by a distance longer than the distances by the second and third powder guiding parts 135B and 135C. The second powder guiding part 135B having the second inclination angle A12, which is smaller than the first inclination angle A11 and larger than the third inclination angle A13, moves the powder 90 in the left/right direction by a distance that is shorter than the distance by which the first powder guiding part 135A moves the powder 90 in the left/right direction and longer than the distance by which the third powder guiding part 135C moves the powder 90 in the left/right direction. The third powder guiding part 135C having the third inclination angle A13, which is the smallest angle relative to the moving direction, moves the powder 90 in the left/right direction by a distance shorter than the distances by the first and second powder guiding parts 135A and 135B.

Further, the main shaft 133 in this embodiment includes the first powder guiding part 135A having the first inclination angle A11 at a position near the end of the main shaft 133 in the axial direction, and includes the second powder guiding part 135B having the second inclination angle A12 smaller than the first inclination angle A11 at a position closer to the center of the main shaft 133 than the position of the first powder guiding part 135A is. By the above-described configuration, the recoater 10 moves the powder 90 laid in the left and right ends of the powder bed 91 toward the center thereof in the left/right direction by a relatively long distance, and moves the powder 90 laid in the center of the powder bed 91 in the left/right direction toward the left and right end sides by a relatively short distance. By the above-described configuration, the recoater 10 can make unevenness, which occurs after the powder 90 supplied from the powder supply apparatus 30 is leveled by the leveling plate 131, uniform and smooth in a more dynamic manner.

An example of the configuration of the powder guiding parts 135 in the powder guiding block 132 has been described above. As described above, the powder guiding parts 135 are provided around the main shaft 133 along a predetermined inclination angle relative to the moving direction. However, various types of powder guiding parts 135 can be adopted. For example, the powder guiding parts 135 may be ones that are formed around the main shaft 133 in parallel with and adjacent to each other as in the case of the third powder guiding part 135C in the above-described example. Further, the powder guiding parts 135 may be spirally formed around the main shaft 133 as shown as the fourth powder guiding part 135D.

Further, regarding the powder guiding block 132, for example, the main shaft 133 and the conversion part 134 may be formed as one integrated component. In this case, the main shaft 133 includes a plurality of powder guiding parts 135. The inclination angles of the powder guiding parts 135 may be equal to each other or different from each other. The main shaft 133 may be one that is set so that a plurality of areas are successively connected to one another along the axial direction, and powder guiding parts 135 having shapes different from each other may be provided in the plurality of the areas, respectively.

Although embodiments have been described above, the configuration of the recoater 10 according to the embodiment is not limited to the above-described configuration. For example, when the recoater 10 does not require the powder pressing roller 137 or the powder pressing plate 139, it may be removed from the above-described configuration. The rotating direction of the powder guiding block 132 may be the forward direction as described above or may be set in a reverse direction. The configuration of the powder supply apparatus 30, which constitutes a part of the powder additive manufacturing apparatus 1, is not limited to the above-described configuration. For example, the powder supply apparatus 30 may be disposed inside the main-body block 20 and configured so as to push up a predetermined amount of powder 90 onto the upper surface of the main-body block 20. Further, the main-body block 20 may include a mechanism by which when the recoater 10 returns to the initial position after it has spread the powder 90 across the powder bed 91, the recoater 10 can be moved downward and thereby moved away from the movable block 13. Further, the recoater 10 may include a mechanism by which when the recoater 10 returns to the initial position after the movable block 13 has spread the powder 90 across the powder bed 91, the recoater 10 can be temporarily raised and thereby moved away from the upper surface of the main-body block 20.

As described above, according to the embodiment, it is possible to provide a recoater and a powder additive manufacturing apparatus capable of preventing unevenness from occurring in powder that is spread across a powder bed.

Note that the present invention is not limited to the above-described embodiments, and they can be modified as appropriate without departing from the scope and spirit of the invention.

This application is based upon and claims the benefit of priority from Japanese patent application No. 2021-072290, filed on Apr. 22, 2021, the disclosure of which is incorporated herein in its entirety by reference.

REFERENCE SIGNS LIST

1 POWDER ADDITIVE MANUFACTURING APPARATUS
10 RE-COATER
11 MOVING MECHANISM
13 MOVABLE BLOCK
20 MAIN-BODY BLOCK
21 POWDER BED SUPPORT PART
22 POWDER RECEIVING PART
30 POWDER SUPPLY APPARATUS
31 POWDER SUPPLY PORT
40 LASER OSCILLATION DEVICE
41 LASER LIGHT
90 POWDER
91 POWDER BED
92 MANUFACTURED PRODUCT
111 FEEDING SHAFT DRIVE MOTOR
112 FEEDING SHAFT
113 BEARING
130 FRAME
131 LEVELING PLATE
132 POWDER GUIDING BLOCK
133 MAIN AXIS
134 CONVERSION UNIT
135 POWDER GUIDING PART
136 MAIN-SHAFT DRIVE MOTOR
137 POWDER PRESSING ROLLER
138 ROLLER DRIVE MOTOR
139 POWDER PRESSING PLATE
140 POWDER PRESSING SURFACE

The invention claimed is:

1. A recoater configured to spread a supplied powder across a powder bed, comprising:
a main shaft configured to rotate about an axis parallel to a surface of the powder bed;
a moving mechanism configured to move the main shaft in a moving direction perpendicular to the main shaft and parallel to the surface of the powder bed; and
a plurality of powder guiding parts disposed around the main shaft along predetermined inclination angles relative to the moving direction; and
a plurality of cylindrical conversion parts successively connected to one another around the main shaft and along an axial direction inside the plurality of powder guiding parts,
wherein the main shaft is set in such a manner that a plurality of areas are successively connected to one another along the axial direction,
wherein each of the areas includes a respective cylindrical conversion part,
wherein the powder guiding parts are spirally projecting members fixed to outer peripheral parts of the cylindrical conversion parts, and
wherein the inclination angles of the powder guiding parts are different from each other.

2. The recoater according to claim 1, wherein each powder guiding part includes a tip part extending along a circumference at a predetermined distance from a center of the main shaft.

3. The recoater according to any claim 1, wherein the plurality of the powder guiding parts are formed in parallel with and adjacent to each other around the main shaft.

4. The recoater according to claim 1, wherein powder guiding parts having shapes different from each other are provided in the plurality of areas, respectively.

5. The recoater according to claim 1, wherein the main shaft includes a first powder guiding part having a first inclination angle at a position near an end of the main shaft in an axial direction, and includes a second powder guiding part having a second inclination angle smaller than the first inclination angle at a position closer to a center of the main shaft than the position of the first powder guiding part is.

6. The recoater according to claim 1, further comprising a leveling plate disposed in a front of the main shaft in the moving direction, a main surface of the leveling plate faces forward in the moving direction, and one end of the leveling plate being configured to come into contact with the surface of the powder bed while being parallel to the surface of the powder bed.

7. The recoater according to claim 1, further comprising a powder pressing roller, the powder pressing roller being a cylindrical member disposed in parallel with the main shaft behind the main shaft in the moving direction, the powder pressing roller being configured to come into contact with the surface of the powder bed while being parallel to the surface of the powder bed.

8. The recoater according to claim 1, further comprising a powder pressing plate disposed behind the main shaft in the moving direction, the powder pressing plate comprising a powder pressing surface, the powder pressing surface being configured to come into contact with the surface of the powder bed while being parallel to the surface of the powder bed.

9. A powder additive manufacturing apparatus comprising:
   a recoater according to claim 1; and
   a powder bed support part configured to support the powder bed formed by the recoater.

* * * * *